United States Patent
Kutscher et al.

(10) Patent No.: US 6,796,163 B2
(45) Date of Patent: Sep. 28, 2004

(54) LEAK-TIGHTNESS AND OPERATIONAL TEST OF A STOP VALVE IN A PNEUMATIC SUSPENSION

(75) Inventors: Eberhard Kutscher, Dettenhausen (DE); Udo Walter, Geislingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/153,309

(22) Filed: May 22, 2002

(65) Prior Publication Data

US 2002/0189331 A1 Dec. 19, 2002

(30) Foreign Application Priority Data

May 31, 2001 (DE) .......................................... 101 26 458

(51) Int. Cl.⁷ .......................................... G01M 19/00
(52) U.S. Cl. .................................................. 73/11.01
(58) Field of Search ............................ 73/11.04, 11.07, 73/11.08, 11.09, 40, 46, 49.7, 40.5 R, 11.06, 633, 37.5, 146, 168, 52, 118.1, 40.5 A; 280/5.507, 5.513, 5.514, 5.515, 5.503, 708; 702/51; 137/636

(56) References Cited

U.S. PATENT DOCUMENTS

| | | | | |
|---|---|---|---|---|
| 4,096,736 A | * | 6/1978 | Moshier ........................ 73/40 |
| 4,441,357 A | * | 4/1984 | Kahn et al. .................... 73/40 |
| 4,517,832 A | | 5/1985 | Holland et al. |
| 4,619,467 A | * | 10/1986 | Lafferty ....................... 280/708 |
| 4,856,815 A | * | 8/1989 | Tanaka et al. ............... 280/707 |
| 5,246,247 A | * | 9/1993 | Runkel ........................ 280/708 |
| 5,393,087 A | * | 2/1995 | Taniguchi et al. .......... 280/707 |
| 5,404,748 A | * | 4/1995 | Jimison et al. ................ 73/40 |
| 5,471,400 A | * | 11/1995 | Smalley et al. ............. 364/509 |
| 5,509,512 A | * | 4/1996 | Grundei ....................... 188/284 |
| 5,547,211 A | * | 8/1996 | Runkel ........................ 280/708 |
| 5,624,105 A | * | 4/1997 | Runkel ..................... 267/64.15 |
| 5,649,692 A | * | 7/1997 | Gilsdorf et al. .......... 267/64.21 |
| 5,861,547 A | * | 1/1999 | Kawai et al. ................. 73/49.2 |
| 6,196,514 B1 | * | 3/2001 | Kienholz .................... 248/550 |
| 6,332,624 B1 | * | 12/2001 | Gilsdorf et al. ......... 280/124.16 |

FOREIGN PATENT DOCUMENTS

| | | |
|---|---|---|
| DE | 40 18 712 | 12/1991 |
| DE | 692 06 936 | 3/1993 |
| DE | 198 53 126 | 5/2000 |
| DE | 199 02 049 | 8/2000 |
| DE | 199 04 908 | 8/2000 |

\* cited by examiner

Primary Examiner—Edward Lefkowitz
Assistant Examiner—Octavia Davis
(74) Attorney, Agent, or Firm—Kenyon & Kenyon

(57) ABSTRACT

A method is for the leak-tightness and operational testing of a stop valve of a pneumatic suspension of a motor vehicle with gas springs, with at least in each case one active volume capable of being connected via the stop valve, the vehicle including at least one connectable pressure source, at least one connectable pressure sink and, for each axle, at least one measuring device determining the distance to the vehicle body, and also damping elements limiting the stroke of the respective gas spring. For this purpose, in a first step, with the stop valve open, a stroke, during which at least one damping element is compressed, is set on the individual gas spring. In a second step, after the closing of the stop valve, the individual gas spring is set to a part-stroke of its total stroke between the damping elements. In a third step, after the opening of the stop valve, the distance which is established between the axle and the vehicle body is determined with the aid of the measuring device and is compared with a predetermined desired value. Thus, a method for leak-tightness and operational testing is provided, which is performed, without the dismantling of components, by the devices already present in the vehicle.

14 Claims, 1 Drawing Sheet

LEAK-TIGHTNESS AND OPERATIONAL TEST OF A STOP VALVE IN A PNEUMATIC SUSPENSION

FIELD OF THE INVENTION

The present invention relates to a method for the leak-tightness and operational testing of a stop valve of a pneumatic suspension of a motor vehicle, with a gas spring supporting a wheel relative to the vehicle body in each case at least on one axle, and with at least in each case one active volume capable of being connected via the stop valve, the pneumatic system and the chassis including at least one connectable pressure source, at least one connectable pressure sink and, for each axle, at least one measuring device directly or indirectly determining the distance between the axle and the vehicle body, and also damping elements limiting the stroke of the respective gas spring.

BACKGROUND INFORMATION

In a motor vehicle equipped with a pneumatic suspension, gas springs are arranged on one or more axles between the vehicle body and the links or axle parts guiding or carrying the wheels.

The spring action of a pneumatic suspension is determined essentially by the spring rigidity of the gas springs, for example, of the air springs. The spring rigidity is dependent, inter alia, on the enclosed gas volume, the effective cross-sectional area of the compressed volume, the internal pressure and, if appropriate, the compressibility of the pneumatic medium. The greater the enclosed volume and the lower the internal pressure, the lower the spring rigidity and the softer the spring. The enclosed volume is designated hereafter as the active volume.

Pneumatic suspensions in which the individual gas springs have a spring rigidity variable with the aid of a stop valve are commercially available. The spring rigidity is then set harder or softer, depending on the driving conditions. In order to achieve a soft suspension, a gas spring is connected together with an additional-volume vessel. If hard suspension is to be achieved, the connection between the two volumes is separated. In addition, the gas springs of these suspensions are often associated with level control systems, with the aid of which the vehicle body can be raised or lowered, depending on the load or on the conditions of use. In this case, the volume additionally necessary in the event of a rise in level is provided by a pressure source.

If the connection of the individual gas spring together with a corresponding additional-volume vessel does not occur reliably, the individual gas springs may have different spring rigidities. This is detrimental to the driving comfort of the vehicle. The cause of unreliable functioning may be, for example, a malfunction in the activation of the valve or a leak. To prevent such a malfunction, the valves have to be regularly tested. This is performed, for example, by dismounting the valve and testing it on a test stand. This is complicated and requires additional measuring and testing instruments.

It is an object of the present invention to provide a method for leak-tightness and operational testing, which may be performed in a time-saving manner and without additional outlay in terms of measuring means.

SUMMARY

The above and other beneficial objects of the present invention are achieved by providing a method as described herein. In one example embodiment of the method according to the present invention, in a first step, with the stop valve open, a stroke, during which at least one damping element is compressed, is set on the individual gas spring. In a second step, after the closing of the stop valve, the individual gas spring is set to a part-stroke of its total stroke between the damping elements. In a third step, after the opening of the stop valve, the distance which is established between the axle and the vehicle body is determined with the aid of the measuring device and is compared with a predetermined desired value.

According to another example embodiment of a method according to the present invention, in a first step, with the stop valve open, the individual gas spring is set to a part-stroke of its total stroke between the damping elements. In a second step, after the closing of the stop valve, a stroke, during which at least one damping element is compressed, is set on the individual gas spring. In a third step, after the opening of the stop valve, the distance which is established between the axle and the vehicle body is determined with the aid of the measuring device and is compared with a predetermined desired value.

In the first method described above, with the stop valve open, the same pressure prevails in the entire active volume of a gas spring and in its connectable active volume. The pressure in the active volumes falls or rises as a result of the compression of at least one damping element limiting the contraction or expansion stroke of the gas spring. In the second step, after the separation of the volumes by the respective stop valve, the pressure is maintained in the connectable active volume, while the pressure is increased or reduced in the individual gas spring, with the respective damping element being relieved at the same time. In the third step, pressure compensation between the gas spring and the additional-volume vessel occurs as a result of the opening of the stop valve.

In the second method described above, in the first step, pressure compensation is produced in the entire active volume of the gas spring and of the additional-volume vessel. In the second step, the pressure is mentioned in the connectable active volume, while the pressure is increased or reduced in the individual gas spring by load being exerted on a damping element. In the third step, pressure compensation between the gas spring and the connectable active volume occurs as a result of the opening of the stop valve.

If the level change of the vehicle body which is established after the opening of the stop valve deviates from a predetermined desired-value change, there is a malfunction of, for example, the stop valve.

The test of operational leak-tightness may be performed, without the dismantling of components, by the devices already present in the vehicle. This test saves time and requires a low outlay in terms of assembly.

The pressure source may in this case be, for example, a compressor or a pressure accumulator. The pressure sink may be the free surroundings downstream of a discharge valve.

The measuring device may be, for example, a level-measuring instrument, a sensor or a body acceleration sensor.

A measuring device of this type may be arranged, for example, on each axle or on each wheel.

The subassembly described as a gas spring may also include two or more parallel-connected or series-connected individual springs.

The suspension may also be filled at least partially with a liquid, instead of with a gas, for example, air. This medium may be incompressible. In order to achieve a spring action, for example, a diaphragm, if appropriate in a compensating tank, is arranged on each of the springs.

The valves arranged in the connecting lines between the springs may be activated centrally. For this purpose, for example, the valves may have electromagnetically actuated coils. These may be connected to a control unit and be influenced by the latter.

Further details of the invention may be gathered from the following description of a schematically illustrated example embodiment.

DETAILED DESCRIPTION

Figure 1:
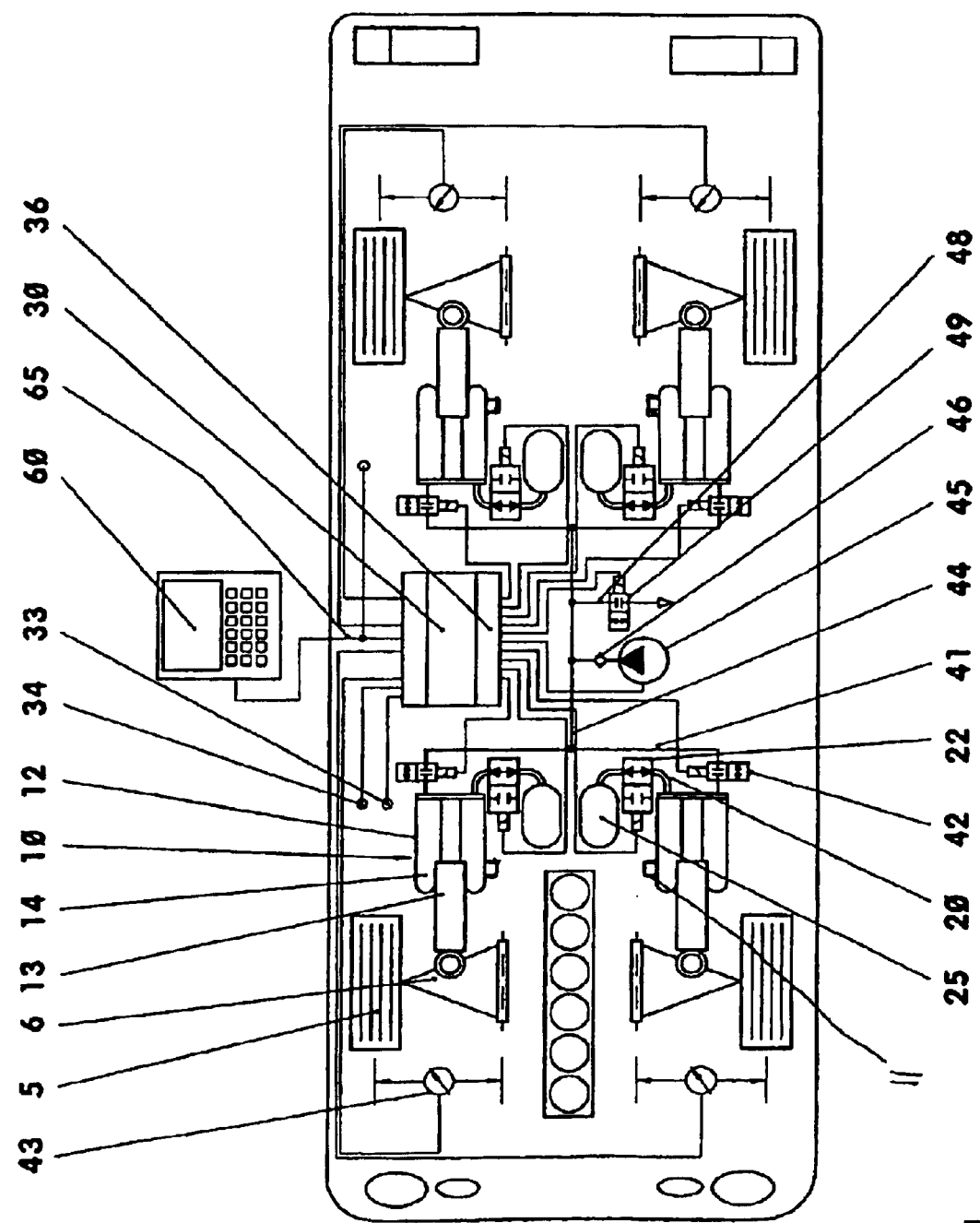
FIG. 1 is a schematic circuit diagram of a pneumatic suspension with variable spring rigidity.

FIG. 1 shows the circuit diagram of a pneumatic suspension with variable spring rigidity. For this purpose, gas springs (10), additional-volume vessels (25), valves (22), a control unit (30) with inputs and outputs (36), a compressor (45) and a computer (60) are connected together. The components and their installation positions are illustrated schematically. In the example embodiments, the individual gas spring (10) contains, for example, a hydraulic shock absorber which serves, inter alia, also for bellows guidance.

For limiting the stroke of the individual gas spring (10), damping elements, for example, damping buffers (11), are arranged on the vehicle body on the wheel-guiding or wheel-carrying links (6) and/or on the gas springs (10), etc.

The gas springs (10) consist of a U-type bellows (12) and of a piston (13). These enclose part of an active volume (14). Two pipelines (20, 41) of different nominal width are fastened to each gas spring (10).

Each individual gas spring (10) is connected to an additional-volume vessel (25), for example, a pressure vessel, via the line (20) which has a larger cross-section than the line (41).

A 2/2-way valve (22) with a neutral stop position and with a throughflow position is arranged in each of these lines (20). This valve (22) is activated electromagnetically. The valve (22) receives the control signal from the outputs (36) of the control unit (30).

In each case one line (41) connects in each case two gas springs (10) of an axle. A 2/2-way valve (42) with a neutral stop position and with a throughflow position is arranged in each case in these lines (41) in the vicinity of the gas springs (10). These valves (42) are individually activated electromagnetically. The valves (42) receive the control signals from the outputs (36) of the control unit (30). Between the two valves (42) of one axle, a connecting line (44) to the other axle is arranged, for example, in the region of the middle of the line (41).

A line with a non-return valve (46) and with the compressor (45) branches off from the connecting line (44). The non-return valve (46) blocks in the direction of the compressor (45). The compressor (45) receives its control signal from the outputs (36) of the control unit (30). Furthermore, a further line (48), which leads into the open via a discharge valve (49), branches off at the connecting line (44). The discharge valve is a 2/2-way valve (49) with a neutral stop position and with a throughflow position. This valve (49) is also activated electromagnetically. It receives the control signal from the outputs (36) of the control unit (30).

Arranged in the vicinity of each wheel (5) is a measuring device (43), for example, a sensor, a level-measuring instrument, etc., which determines the level value of the vehicle on the corresponding wheel (5). This value from each measuring device (43) is transmitted as an input signal to the control unit (30). Further input variables of the control unit (30) are the speed and steering angle of the vehicle which are detectable with the aid of the sensors (33) and (34).

A computer (60) is connected to the control unit (30) via a data line (65). In this case, at least the computer (60) is demountable. The data line (65) may be part of a CAN bus, to which further control units may be connected.

In a state of rest, the valves (22) in the lines (20) to the additional-volume vessels (25) and the valves (42) in the lines (41) are, for example, closed.

If the level value of a sensor (43) of a wheel (5) undershoots a desired value, the compressor (45) is switched on and the valve (42) belonging to the respective wheel (5) or to the respective gas spring (10) opens. Gas is conveyed into the corresponding gas spring (10). The extension of the piston (13) brings about an increase in the level value at the sensor (43). In this case, the pressure in the gas spring (10) remains approximately the same. When the desired value of the level is reached, the valve (42) is closed again and the compressor (45) is switched off. To reduce the pressure in the lines (41, 44), the discharge valve (49) is opened and, for example, after a set timespan, is closed again.

If the level value on a gas spring (10) is increased to a value at which the damping buffer (11) limiting the expansion-stroke movement is compressed, a counterforce to the internal pressure of the gas spring (10) is built up by the damping buffer (11). With the counterforce, the force of the gas spring (10) necessary for the further expansion of the gas spring (10) rises. This force is approximately proportional to the internal pressure of the gas spring (10) which in this case is generated by the compressor (45).

If the associated valve (42) is shut off or the compressor (45) is switched off, an equilibrium of forces occurs between the counterforce of the damping buffer and the force, generated by the internal pressure, on the piston area of the gas spring (10). The gas spring (10) remains in this position.

If the level value at the sensor (43) of a wheel (5) exceeds a desired value, the valve (42) arranged on the corresponding wheel (5) and the discharge valve (49) are opened until the level value at the corresponding sensor (43) has reached its desired value. Then, first the valve (42) and thereafter the discharge valve (49) are closed.

If the level of the vehicle body in the region of wheel (5) is lowered, as a result of the opening of the valves (42, 49), to an extent such that the damping buffer (11) downwardly limiting the stroke of the respective gas spring (10) is compressed, a counterforce to the sum of the load caused by the vehicle body and of the force on the piston (13) induced by the internal pressure of the gas spring (10) is built up by the damping buffer (11). When these two forces are in equilibrium, the vehicle body remains in this position.

Both during the raising of the level and during the lowering of the level, it is presupposed that the vehicle stands on or rolls on a support, for example, the roadway, at least with the wheel (5) affected by the level control.

The spring rigidity of the gas spring (10) is determined, with the valve (22) closed, essentially by the gas volume (14) enclosed in the spring (10). With the valve (22) open, the volume increases by the amount of the volume of the additional-volume vessel (25). The spring (10) is then softer.

During normal travel, the valves (22) are opened and the suspension is soft. During travel at high speed, for example, the valves (22) may be switched into the blocking position. The respective active volume (14) of the individual gas springs (10) is thereby reduced and the gas springs (10) become more rigid.

If the vehicle travels, for example, in town traffic again, the valve (22) in the lines (20) are opened again. The active volumes (14) of the gas springs (10) are increased, and the gas springs (10) become softer.

Throttled valves (22, 42) may also be used in the lines (20) between the gas springs (10) and the additional-volume vessels (25) and in the lines (41, 44) for level control. The valves (22, 42) may be switched in at least one switching direction electromagnetically, by spring load or pneumatically. For example, the valves (42) of the level control system and the discharge valve (49) are closed in the currentless state, in order to avoid a lowering of the vehicle in the event of a power failure. This also applies to the valves (22) in the lines (20). The active volume (14) of the corresponding gas spring (10) is then, in the currentless state, essentially the volume enclosed by the gas spring (10). The respective gas spring (10) becomes hard.

In order to ensure the driving comfort of the vehicle in all driving ranges, the operation of the valves (22) is tested within the framework of the maintenance of the vehicle. For this purpose, the vehicle stands on its wheels (5). In the initial position, for example, all the valves (22, 42) are closed. The compressor (45) is, for example, switched off and the discharge valve (49), if appropriate, is likewise closed.

The valves (22) connecting the gas springs (10) to the additional-volume vessels (25) are opened. This leads to pressure compensation between the volume of the individual gas spring (10) and the respective additional-volume vessel (25). A pressure, designated hereafter as initial pressure, is established.

After the opening of the discharge valve (49) and the, if appropriate, axle-related opening of the valves (42), the vehicle body is lowered. The pressure in the individual gas spring (10) remains equal to the pressure in its associated additional-volume vessel (25).

If the damping buffer (11) downwardly limiting the stroke of the individual gas spring (10) is compressed, the pressure in the gas spring (10) and in the additional-volume vessel (25) falls. When this has fallen, for example, to 50% of the initial pressure, the valves (42) and the discharge valve (49) are closed.

The pressure in the individual gas spring (10) and in the respectively associated additional-volume vessel (25) continues to be, for example, 50% of the initial pressure.

The valves (22), then, are closed, and the volumes of the gas springs (10) are thereby separated from the respectively associated additional volume (25).

Next, the compressor (45) is started, and the valves (42) are opened, if appropriate in an axle-related manner. The vehicle body level is raised. At the same time, the damping buffers (11) are relieved and the pressure in the individual gas spring (10) rises.

When the vehicle body has reached a level of, for example, 20 mm above the design position, the valves (42) are blocked and the compressor (45) is switched off.

Approximately the initial pressure then prevails in the individual gas spring (10), while the pressure in the additional-volume vessel (25) continues to be, for example, 50% of this pressure.

The valves (22), then, which connect a gas spring (10) to its additional-volume vessel (25), are, for example, opened individually. This leads to abrupt pressure compensation between the two volumes. The level of the vehicle body in the region of this gas spring (10) falls simultaneously. The level or level change which is then established is determined with the aid of the level-measuring instrument (43).

Instead of the pressure in the gas spring (10) being increased in relation to the pressure in the additional-volume vessel (25), it may also be reduced. For this purpose, with the vehicle body being, for example, in the design position, and with the valves (42) closed, the pressure between the individual gas spring (10) and its additional-volume vessel (25) is then compensated by the opening of the respective valve (22). A pressure, designated hereafter as initial pressure, is established. The compressor (45), then, is switched on, and the valves (42) are opened, if appropriate in an axle-related manner. The vehicle body is raised until the respective damping buffer (11) limiting the expansion-stroke movement is compressed. With an increase in compression of the respective damping buffer (11), the pressure in the gas spring (10) and in the associated additional-volume vessel (25) rises. When this pressure has risen, for example, to 150% of the initial pressure, the respective valve (42) is closed and the compressor (45) is switched off. The same pressure of, for example, 150% of the initial pressure then prevails in the gas spring (10) and in the additional-volume vessel (25).

The valves (22), then, are blocked, and the respective gas spring (10) is consequently separated from its additional-volume vessel (25). Thereafter, the discharge valve (49) is opened and the valves (42) are opened, for example, individually or in an axle-related manner. The vehicle body is lowered. The damping buffers (11) are relieved and the pressure in the individual gas spring (10) decreases, while the pressure in the respective additional-volume vessel (25) continues to be, for example, 150% of the initial pressure. When the vehicle body has reached, for example, a level 20 mm below the design position, the respective valves (42) and the discharge valve (49) are closed. The pressure in the individual gas springs (10) then corresponds approximately to the initial pressure, while the pressure in the additional-volume vessel (25) continues to be, for example, 150% of this pressure.

In this case, too, the opening of the respective valve (22) brings about abrupt pressure compensation between the individual gas spring (10) and its additional-volume vessel (25). The vehicle level is raised. The level or level change which is established is determined with the aid of the level-measuring instrument (43).

Another method may also be chosen for generating a higher pressure in the individual gas spring (10) than in the associated additional-volume vessel (25).

For this purpose, for example, at the start of the testing of the vehicle body is, for example, in the design position. With the pressure between the individual gas spring (10) and its associated additional-volume vessel (5) being compensated, the valve (22) is blocked. With the stop valve (49) blocked, the compressor (45) is switched on and the individual valves (42) are opened. The level of the vehicle body is raised until the damping buffer limiting the expansion movement of the gas spring (10) is compressed by a predefined amount or a threshold value for the pressure in the active volume (14) is reached.

The respective valve (42) is blocked, and the compressor (45) is switched off. The pressure in the gas spring (10) is then higher than in the additional-volume vessel (25). Pressure compensation after the opening of the respective stop valve (22) leads to a lowering of the vehicle body.

In a similar manner to this, the pressure in the gas spring (10) may be reduced in relation to the pressure in the additional-volume vessel (25). The vehicle body is then lowered, for example, from the design position, with the valve (22) blocked, with the compressor (45) switched off, with the discharge valve (49) open and with the valve (42) open. Lowering occurs until the damping buffer (11) limiting the stroke of the gas spring (10) is compressed by a predetermined amount or the internal pressure of the active volume (14) of the gas spring (10) has reached a predetermined lower threshold value.

If the preset threshold value of the travel or the pressure is reached, the valve (42) is closed. The pressure in the gas spring (10) is then lower than the pressure in the additional-volume vessel (25). During pressure compensation as a result of the opening of the valve (22), the vehicle body is raised.

The values of the vehicle body level which are obtained after the opening of the valve (22) are compared with desired values. If, in the first instance, the pressure in the individual gas spring (10) is higher than in the associated additional-volume vessel (25), the level of the vehicle body established after the opening of the respective valve (22) is too high or the level change is too small, for example, the operation of the valve (22) is faulty. If the pressure in the active volume (14) of the gas spring (10) is too high, pressure compensation was insufficient. If the level established is too low or the level change is too great, there may be a leakage at the valve (22) or the additional-volume vessel (25).

If, in the second instance, the pressure in the individual gas spring (10) is lower than in the associated additional-volume vessel (25), the level established after the opening of the respective valve (22) is too low or the level change is too small, there is, for example, likewise a malfunction of the valve (22) or a leakage in the region of the gas spring (10), of the valve (22) or of the additional-volume vessel (25).

These tests may be performed individually, for example in succession, on all the wheel suspensions (6) of the vehicle. They may, however, also be performed simultaneously on all the wheel suspensions (6) or in an axle-related manner. Also, depending on the capacity of the compressor (45) and of the lines (41, 44, 48), for example, individual test steps may be performed simultaneously on all the wheel suspensions (6) and the remaining test steps individually on each wheel suspension (6).

In order to perform the tests of the stop valves (22), the control unit (30) may be connected to an external computer (60) via a data line (65), for example, a CAN bus. This computer may, for example, be a diagnostic laptop (60).

The test sequence may be controlled from the diagnostic laptop (60) with the aid of a sequential program. The result of the test may then also be output with the aid of this program. The result of the test may document satisfactory operation of all the valves (22), a malfunction of an individual valve (22) or a leakage at an individual valve (22). A leakage in the region of a gas spring (10) or of an additional-volume vessel (25) or their connecting line (20) may also be detected and be output as a result. These results may, if appropriate, also be stored or printed out. The history may thus be documented or tendencies recognized.

The test-sequence program may also be implemented in the control unit (30), the data of which are, for example, retrievable. The evaluation of the data may also occur in a computer-assisted manner.

The individual travels or pressure values may, for example, be in a fixed relation to one another. The repeatability of the test may thus be ensured.

To determine the internal pressure of the individual gas spring (10), for example, a pressure sensor may be arranged, for example, in or on the individual gas spring (10). If appropriate, a sensor of this type may also be positioned in or on the additional-volume vessel (25). The pressure thus determined or the exceeding or undershooting of a threshold value of the pressure in the individual active volumes may then trigger a follow-up function of the test sequence.

| List of reference symbols: | |
|---|---|
| 5 | Wheel |
| 6 | Link |
| 10 | Gas spring, air spring, spring |
| 12 | U-type bellows |
| 13 | Piston |
| 14 | Active volume, enclosed volume |
| 20 | Pipeline, line |
| 22 | Valves, stop valves |
| 25 | Additional-volume vessel |
| 30 | Control unit |
| 33 | Steering-angle sensor |
| 34 | Vehicle-speed sensor |
| 36 | Outputs |
| 41 | Pipeline, line |
| 42 | Valves |
| 43 | Measuring device, level-measuring instrument, sensor |
| 44 | Connecting line between the axles |
| 45 | Compressor, pressure-medium source |
| 46 | Non-return valve |
| 48 | Line |
| 49 | Discharge valve, valve |
| 60 | Computer, diagnostic laptop |
| 65 | Data line |

What is claimed is:

1. A method for leak-tightness and operational testing of a stop valve of a pneumatic suspension of a motor vehicle including a gas spring supporting a wheel relative to a vehicle body at least on one axle and at least one active volume configured to be connected via the stop valve, the pneumatic system and the vehicle including at least one connectable pressure source, at least one connectable pressure sink and, for each axle, at least one measuring device configured to one of directly and indirectly determine a distance between the axle and the vehicle body, and damping elements configured to limit a stroke of the respective gas spring, comprising the steps of:

setting a stroke, during which at least one damping element is compressed, on the gas spring with the stop valve open;

after closing the stop valve, setting the gas spring to a part-stroke of a total stroke between the damping elements;

after opening the stop valve, determining the distance established between the axle and the vehicle body in accordance with the measuring device; and comparing the distance determined in the determining step with a predetermined desired value.

2. The method according to claim 1, wherein a pressure sensor is connected to the gas spring.

3. The method according to claim 2, wherein the stroke setting step includes the substeps of, during compression of the damping element, limiting the stroke of the gas spring and setting the stroke of the gas spring by controlling pressure determined at the pressure sensor.

4. The method according to claim 1, further comprising the step of controlling the stroke setting step, the part-stroke setting step, the determining step and the comparing step in a computer-assisted manner.

5. The method according to claim 4, further comprising the step of evaluating results in a computer-assisted manner.

6. A method for leak-tightness and operational testing of a stop valve of a pneumatic suspension of a motor vehicle including a gas spring supporting a wheel relative to the vehicle body at least on one axle and at least one active volume configured to be connected via the stop valve, the pneumatic system and the vehicle including at least one connectable pressure source, at least one connectable pressure sink and, for each axle, at least one measuring device configured to one of directly and indirectly determine a distance between the axle and the vehicle body, and damping elements configured to limit a stroke of the respective gas spring, comprising the steps of:

with the stop valve open, setting the gas spring to a part-stroke of a total stroke between the damping elements;

after closing the stop valve, setting a stroke on the gas spring during which at least one damping element is compressed;

after opening the stop valve, determining the distance established between the axle and the vehicle body in accordance with the measuring device; and comparing the distance determined in the determining step with a predetermined desired value.

7. The method according to claim 6, wherein a pressure sensor is connected to the gas spring.

8. The method according to claim 7, wherein the stroke setting step includes the substeps of, during compression of the damping element, limiting the stroke of the gas spring and setting the stroke of the gas spring by controlling pressure determined at the pressure sensor.

9. The method according to claim 6, further comprising the step of controlling the part-stroke setting step, the stroke setting step, the determining step and the comparing step in a computer-assisted manner.

10. The method according to claim 9, further comprising the step of evaluating results in a computer-assisted manner.

11. The method as claimed in claim 1 wherein the stop valve is connected between the active volume and the gas spring.

12. The method as claimed in claim 6 wherein the stop valve is connected between the active volume and the gas spring.

13. A method for leak-tightness and operational testing of a stop valve of a pneumatic suspension of a motor vehicle including a gas spring supporting a wheel relative to a vehicle body at least on one axle and at least one active volume connectable via the stop valve, the pneumatic system and the vehicle including at least one connectable pressure source, at least one connectable pressure sink and, for each axle, at least one measuring device configured to one of directly and indirectly determine a distance between the axle and the vehicle body, and damping elements configured to limit a stroke of the respective gas spring, comprising the steps of:

(a) with the stop valve open, setting a stroke on the gas spring at which at least one damping element of the gas spring is compressed;

(b) closing the stop valve after step (a);

(c) after step (b), with the stop valve closed, setting the gas spring to a part-stroke of a total stroke between the damping elements;

(d) opening the stop valve after step (c);

(e) after step (d), with the stop valve open, determining a distance established between the axle and the vehicle body in accordance with the measuring device; and (f) comparing the distance determined in the determining step with a predetermined desired value.

14. A method for leak-tightness and operational testing of a stop valve of a pneumatic suspension of a motor vehicle including a gas spring supporting a wheel relative to the vehicle body at least on one axle and at least one active volume connectable via the stop valve, the pneumatic system and the vehicle including at least one connectable pressure source, at least one connectable pressure sink and, for each axle, at least one measuring device configured to one of directly and indirectly determine a distance between the axle and the vehicle body, and damping elements configured to limit a stroke of the respective gas spring, comprising the steps of:

(a) with the stop valve open, setting the gas spring to a part-stroke of a total stroke between the damping elements;

(b) closing the stop valve after step (a);

(c) after step (b), with the stop valve closed, setting a stroke on the gas spring at which at least one damping element is compressed;

(d) opening the stop valve after step (c);

(e) after step (d), with the stop valve open, determining the distance established between the axle and the vehicle body in accordance with the measuring device; and (f) comparing the distance determined in the determining step with a predetermined desired value.

* * * * *